US011715095B2

(12) United States Patent
Regen et al.

(10) Patent No.: US 11,715,095 B2
(45) Date of Patent: Aug. 1, 2023

(54) DUAL LAYER UNIVERSAL SMART CARD / PHONE

(71) Applicants: Paul Lewis Regen, Felton, CA (US); Tom Czepowicz, San Francisco, CA (US)

(72) Inventors: Paul Lewis Regen, Felton, CA (US); Tom Czepowicz, San Francisco, CA (US)

(73) Assignee: EDGE MOBILE PAYMENTS LLC, Mill Valley, CA (US)

( * ) Notice: Subject to any disclaimer, the term of this patent is extended or adjusted under 35 U.S.C. 154(b) by 328 days.

(21) Appl. No.: 16/853,406

(22) Filed: Apr. 20, 2020

(65) Prior Publication Data

US 2020/0334665 A1    Oct. 22, 2020

Related U.S. Application Data

(60) Provisional application No. 62/836,701, filed on Apr. 21, 2019.

(51) Int. Cl.
*G06Q 20/34* (2012.01)
*G06Q 20/32* (2012.01)
*H01C 7/00* (2006.01)
*G06K 7/04* (2006.01)

(52) U.S. Cl.
CPC ....... *G06Q 20/353* (2013.01); *G06Q 20/3278* (2013.01); *G06Q 20/341* (2013.01); *H01C 7/00* (2013.01); *G06K 7/042* (2013.01)

(58) Field of Classification Search
CPC ............ G06Q 20/353; G06Q 20/3278; G06Q 20/341; H01C 7/00; G06K 7/042; H04M 1/0254; H04M 1/72412
See application file for complete search history.

(56) References Cited

U.S. PATENT DOCUMENTS

| | | | | |
|---|---|---|---|---|
| 2003/0004876 A1* | 1/2003 | Jacobson | ............ | H04M 17/026 705/41 |
| 2004/0077372 A1* | 4/2004 | Halpern | ................ | G07F 7/0866 455/575.3 |

* cited by examiner

*Primary Examiner* — Kristy A Haupt

(57) ABSTRACT

A CTI mobile device includes a first physical layer of electronic components adapted to fit in a first rectangular housing, the components adapted in aggregate to function as a mobile CTI communications device capable of accessing a wireless mobile network, and a second physical layer of electronic components adapted to fit in a second rectangular housing, the components adapted in aggregate to function as a mobile smart card capable of accessing a financial network to perform transactions and manage accounts, the first and second housings adapted to be coupled, and a plurality of contact pads distributed in like number and geometric pattern to interfacing sides of the first and second housings, the contact pads magnetized to attract opposing contact pads to couple the first and second housings together along the interfacing sides.

18 Claims, 4 Drawing Sheets

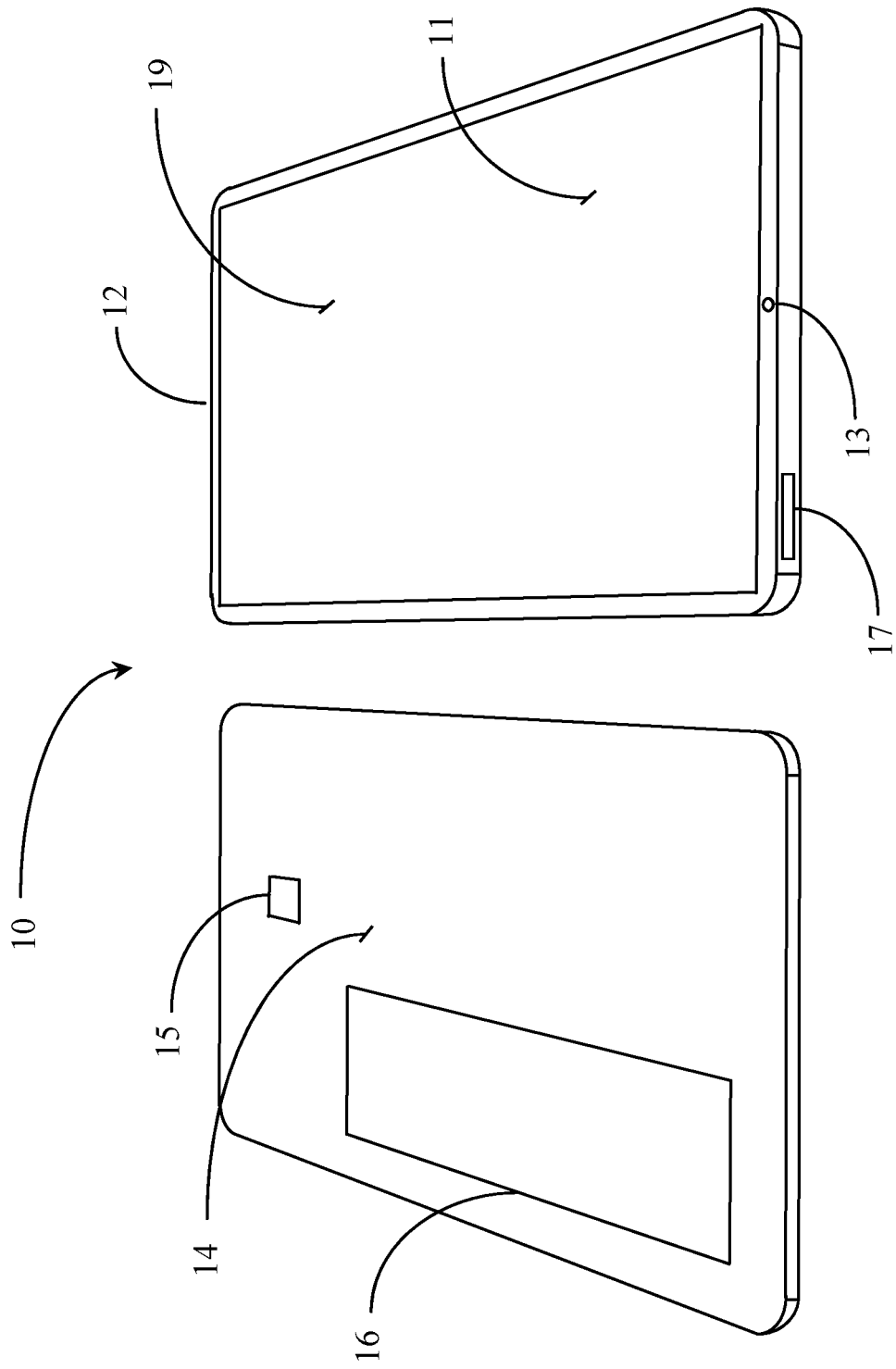

DUAL LAYER UNIVERSAL SMART CARD / PHONE

CROSS-REFERENCE TO RELATED DOCUMENTS

The present invention claims priority to a U.S. provisional patent application Ser. No. 62/836,701, filed on Apr. 21, 2019 entitled "Fully Functional Dual Layer Universal Ultra Smart Card/Phone". The disclosure of the above provisional application is included herein in its entirety at least by reference.

BACKGROUND OF THE INVENTION

1. Field of the Invention

The present invention is in the field of Financial Technology (Fintech) and pertains more particularly to a universal communications device and smart card for use in managing and transferring funds in a mobile environment.

2. Discussion of the State of the Art

In the financial world, value has been exchanged in a historical sense through exchange of gold and silver. Technology evolved and people used fiat money and then credit and debit cards to transfer funds.

It has occurred to the inventors that more technically advanced means of exchanging value is desired. Particularly as new alternative currencies, for example, cryptographic currencies become established, consolidation of access to multiple means of transferring value is desired in the form of a convenient means and apparatus to enable on demand exchanges of value over a mobile network.

Therefore, what is really needed is a dual layer universal smart card and phone aided by a software platform for consolidating access to multiple exchange vehicles and executing on demand value exchanges over a mobile network.

BRIEF SUMMARY OF THE INVENTION

A computer telephony integrated (CTI) mobile transactional and communications device is provided and includes a first physical layer of electronic components adapted to fit in a first rectangular housing having a length, a width, and an internal volume defined by a uniform thickness, the components adapted in aggregate to function as a mobile CTI communications device capable of accessing a wireless mobile network, a second physical layer of electronic components adapted to fit in a second rectangular housing having a same or similar length and width as the first rectangular housing, the second housing having less internal volume defined by a uniform thickness, the components adapted in aggregate to function as a mobile smart card capable of accessing a financial network to perform transactions and manage accounts, the first and second housings adapted to be coupled, and a plurality of contact pads distributed in like number and geometric pattern to interfacing sides of the first and second housings, the contact pads magnetized to attract opposing contact pads to couple the first and second housings together along the interfacing sides.

In one embodiment, the wireless network is one of a wireless fidelity network (WiFi) or a long term evolution (LTE) network. In one embodiment, the first physical layer of electronic components define a master unit in computer hierarchy and wherein the second physical layer of electronic components define a slave unit depended to the master unit for power and programing. In a variation of this embodiment, the master unit and slave unit may exchange data back and forth over a Bluetooth network connection and or a near field connection (NFC). In a preferred embodiment, the length and width dimension for the first and second housings conforms to a credit card form factor. In this embodiment, the thickness dimension of the second rectangular housing conforms to the thickness dimension of a standard credit card form factor.

In one embodiment, the first layer of electronic components include a battery, a controller, and computer memory hosting a platform software master program and wherein the second layer of electronic components include a battery, a controller, and a computer memory hosting a slave program to the master program. In the master slave embodiment, the slave unit may be adapted to access and exchange or transact via magnetic stripe at point of sale terminals and through Euro pay, MasterCard, Visa, (EMV) terminals. In one embodiment, two or more of the plurality of contact pads may be adapted as data exchange points between the first and second layers of components. In one embodiment, the first housing supports a first touch screen display device occupying most or all of the rectangular surface thereof and wherein the second housing supports a second screen display for providing visual data to a user when the second housing is decoupled from the first housing.

In one embodiment, the device of claim 1 further includes a first accelerometer among the electronic components of the first layer, and a second accelerometer among the components of the second layer. In one embodiment, the device of claim 1 further includes a signal processor among the electronic components of the first layer, and at least one radio frequency leak detection circuit among the electronic components of the first layer, wherein the at least one leak detection circuit is adapted to direct by electronic notification to the signal processor, an 180-degree phase shift in the active radio frequency. In a variation of this embodiment, the device further includes at least one data injection circuit among the electronic components in the first layer, the data injection circuit capable of sending misinformation to a device attempting to access the device without authorization. In one embodiment coupling a master unit to a slave unit, the master unit charges the slave unit by induction coil through opposing induction charging pads that contact when the units are coupled.

In one embodiment, the device may further include a first strain gauge on the interfacing side of the first rectangular housing, the strain gauge adapted to detect a bend along the x axis on the surface of the first rectangular housing, and a second strain gauge on the interfacing side of the first rectangular housing, the second strain gauge adapted to detect a bend along the y axis on the surface of the first rectangular housing. In this embodiment, the first and second strain gauges are piezoelectric crystals triggered by stress to produce an output voltage that may be amplified. In a variation of this embodiment, the output voltage is used to charge a battery in the second rectangular housing. In another variation of the embodiment, a voltage is applied to the strain gauges to mitigate stress to a critical level by causing the gauges to flex opposite of the indicated stress forces.

BRIEF DESCRIPTION OF THE SEVERAL VIEWS OF THE DRAWINGS

FIG. 3A is a perspective view of the slave unit of FIG. 2 depicting the side including a display screen.

FIG. 3B is a perspective view of the master unit of FIG. 1 depicting the side including a display screen.

DETAILED DESCRIPTION OF THE INVENTION

In various embodiments described in enabling detail herein, the inventor provides a unique system platform and apparatus for consolidating multiple exchange technologies for access and execution from a single device capable of mobile network communications. The present invention is described using the following examples, which may describe more than one relevant embodiment falling within the scope of the invention.

It is a goal of the present invention to provide a convenient and mobile means to consolidate access to a plethora of value exchange technologies including acceptance of all credit and debit technologies or those desired for consolidation onto a single universal device that may connect to a mobile network.

Figure 1:
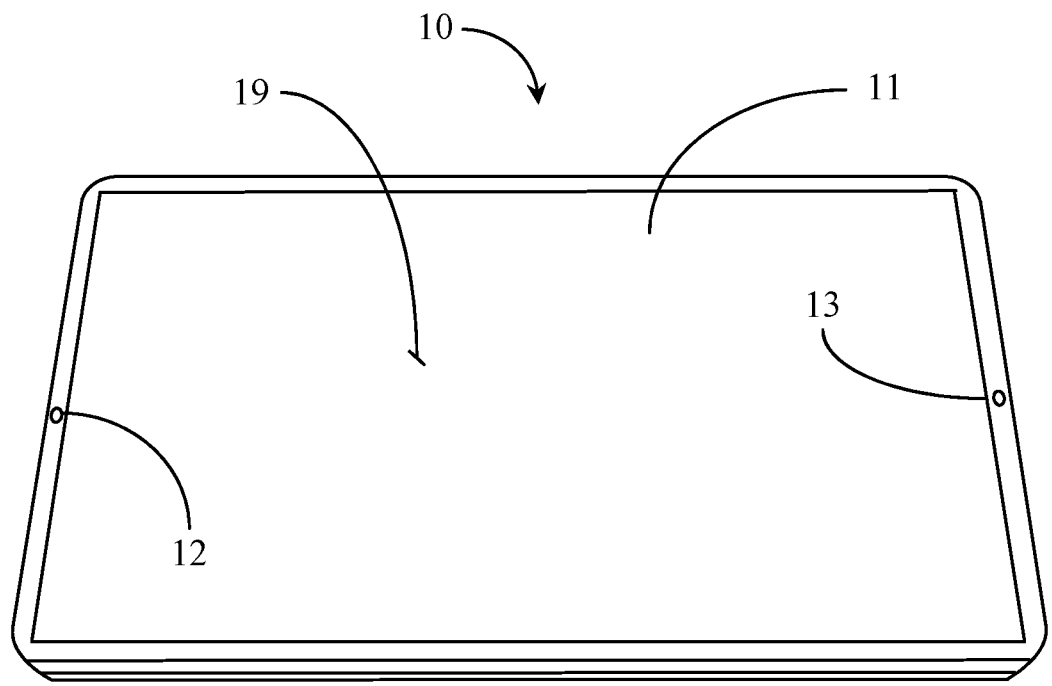
FIG. 1 is a perspective view of a master unit of a dual layer smart card/phone according to an embodiment of the present invention.

FIG. 1 is a perspective view of a master unit representing one half of a dual layer smart card/phone 10 according to an embodiment of the present invention. A master unit (MU) 11 is adapted as one layer of dual layer smart card/phone 10 and may be separated from a slave unit representing the other layer of dual layer device 10. Both layers are coupled or otherwise connected to form one electronic device referred to herein as device 10.

MU 11 has a touchscreen display 19 covering the entire footprint of device 10 on that side of the device. Touchscreen display 19 may be supported by internal circuitry and software and may be used to interact with media, execute transactions, browse the Internet, and perform video calls and the like. MU 11 includes at least two electronic microphones, a microphone 12 and a microphone 13. Microphones 12 and 13 may be adapted to cancel background noise when a user is operating device 10 for use in audio communications, reviewing media including audio, or interacting with application called interfaces resident on the device.

MU 11 may include the aggregate of the electronics available to device 10, which includes the slave unit. MU 11 may include at least one master control unit (MCU) powered by a rechargeable battery. Display screen 19 may be used in conjunction with at least one application to select a user's preferred means of multiple payment options and to enable the user an interface to accept payment from other users over the mobile network.

In one embodiment, screen 19 may be interacted with to unlock or lock the MU 11 or the slave unit coupled to it to form device 10. One primary function of MU 11 is to house a plethora of aggregated financial technologies that would not otherwise fit a credit card form factor. MU 11 may include circuitry and software supporting a variety of wireless communications technologies like Bluetooth, Wi-Fi, and other Long-Term Evolution (LTE) type wireless technologies lending to adaptation as a smart device. MU 11 may be adapted with smart phone technologies enabling communications over a mobile network for voice, video, and data processing. LTE type technologies are not necessarily required if MU 11 is adapted for use as a smart phone.

Figure 2:
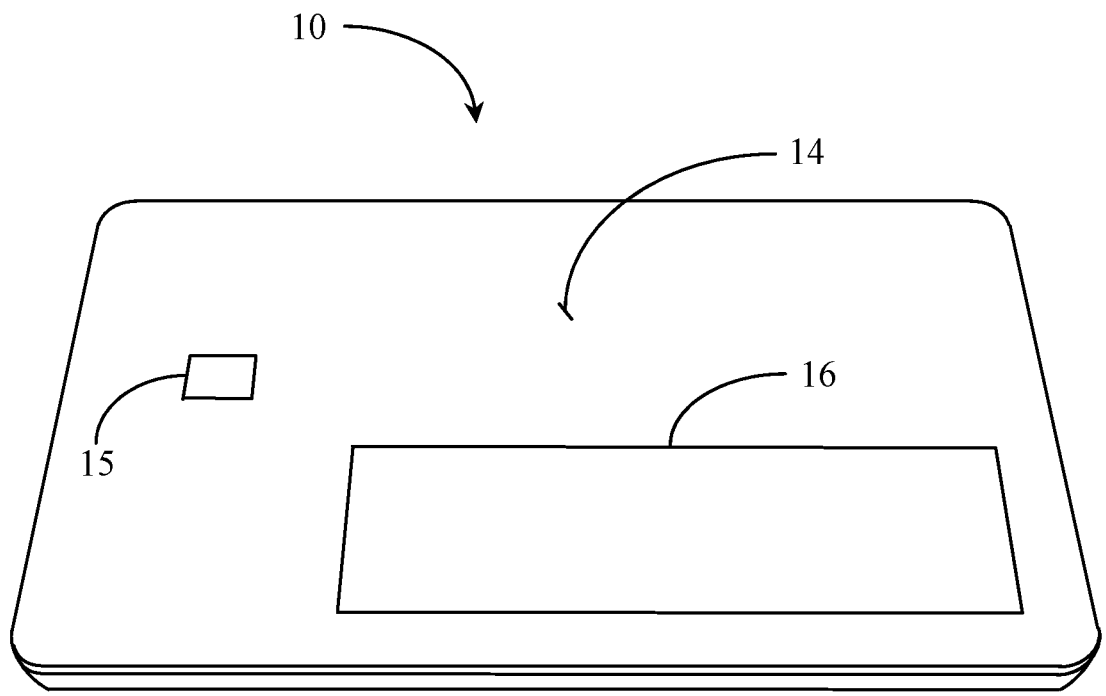
FIG. 2 is a perspective view of a slave unit of a dual layer smart card/phone according to an embodiment of the present invention.

FIG. 2 is a perspective view of a slave unit representing one half of a dual layer smart card/phone 10 according to an embodiment of the present invention. A slave unit (SU) 14 is adapted as one layer of dual layer smart card/phone 10 and may be separated from the master unit (MU) 11 representing the other layer of dual layer device 10. Both layers are coupled or otherwise connected to form one electronic device referred to herein as device 10.

In this view, dual layer device 10 is turned over to depict the SU 14. SU 14 is adapted to function as a universal credit/debit/gift-card device that may be coupled to the master unit. SU 14 includes a smaller display screen 16. Display screen 16 may display feedback and confirmation indicia that a credit or transaction card the user has selected from multiple possibilities programmed into the MU 11 is in fact the card programmed and enabled at the SU 14. SU 14 is enabled to access and exchange through Euro pay MasterCard and Visa (EMV) terminals and includes EMV contacts 15.

The dual layer device 10 comprises the MU 11 and the SU 14 coupled together. The MU 11 may be one of several power sources that may be available to charge and to program the thin credit card-sized portion of device 10, more particularly SU 14. SU 14 is adapted in this embodiment to meet all technical specifications that may be required for the card to function independently from and while connected to MU 11 as a smart card enabling all credit, debit, and gift cards that are standard in the market to be accepted and accessible for transaction.

FIG. 3A is a perspective view of slave unit 14 of FIG. 2 depicting the side including a display screen. SU 14 is contained in a very thin space compared to the thicker MU 11 containing the host electronics and wireless communications technologies. SU 14 is depicted here with the same elements depicted in FIG. 2, more particularly to screen 16 and EMV contact box 15.

FIG. 3B is a perspective view of the master unit of FIG. 1 depicting the side including a display screen. MU 11 is contained in a thicker space compared to SU 14 because of the electronics hosted including the controller and battery. Device 10 may have a combined layer thickness comparable to a typical thin smartphone device with a similar width and length dimension profile. MU 11 includes a speaker device 17.

Figure 4B:
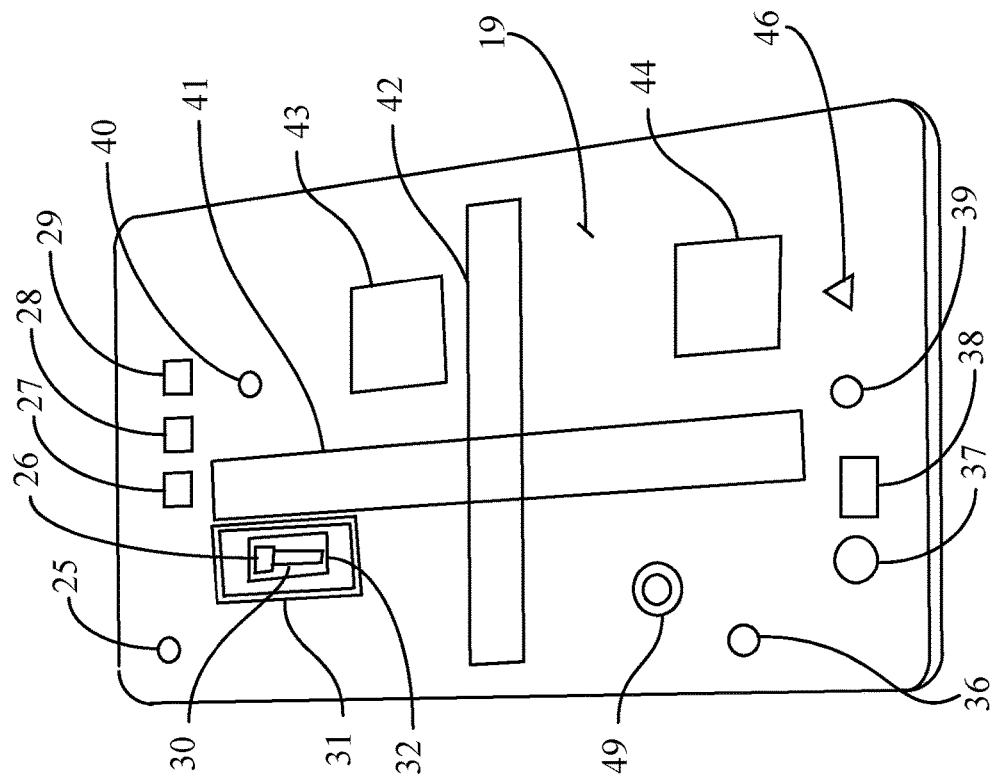
FIG. 4B is a perspective view of the master unit of FIG. 3B depicting the side that interfaces with the slave unit.
Figure 4A:
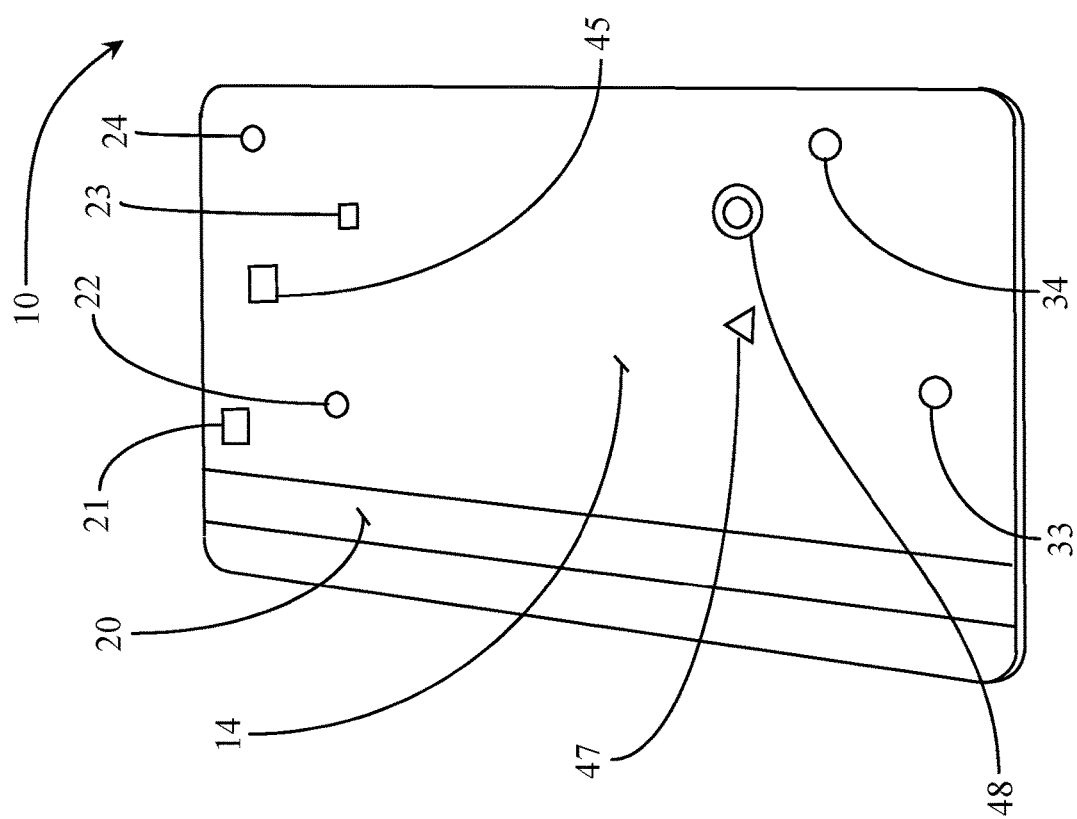
FIG. 4A is a perspective view of the slave unit of FIG. 3A depicting the side that interfaces with the master unit.

FIG. 4A is a perspective view of slave unit 14 of FIG. 3A depicting the side that interfaces with the master unit. FIG. 4B is a perspective view of the master unit 11 of FIG. 3B depicting the side that interfaces with the slave unit.

Referring to FIG. 4A, SU 14 of device 10 may include a magnetic stripe 20. Magnetic stripe 20 typically holds the static data for a payment card or credit card but may also include dynamic data. In one embodiment, magnetic stripe 20 has writable memory in addition to the memory required for static data. In this case dynamic data may be added to stripe 20 using a data writer (not illustrated) built into SU 14.

SU 14 may include a near field communication (NFC) wireless component 21. NFC component 21 may transfer dynamically held data and may transfer dynamic data that is written to memory. In one embodiment, SU 14 includes a plurality of contact points that may be magnetic or may be magnetized to hold SU 14 against MU 11 that may include the same pattern of contact points. In this embodiment, contact points 22, 24, 33, and 34 are provided. Contact points just mentioned may be made of any conductive material such as iron or any other material that conducts electricity and may attract a magnet field enough to hold the two device layers, MU 11 and SU 14 together.

In one implementation, contact points 22, 24, 33 and 34 may be connected to an electromagnetic coil connected to a micro circuit that can reverse magnetic poles of the contact points on command to cause magnetic resistance for the purpose of intentionally decoupling the SU 14 from the MU 11. Such a command may be executed by voice, touch screen interaction, programmed button, or dedicated physical switch without departing from the spirit and scope of the present invention.

SU 14 includes an optical data transceiver 23 that communicates with an optical transceiver 26 held on the interfacing side of MU 11. Optical data transceivers 23 and 26 are adapted to pass data back and forth between SU 14 and MU 11. Optical data transceivers are adapted to minimize electromagnet radiation emanating from the two layers of device 10 when data is transferred between SU 14 and MU 11 improving security. SU 14 includes a Bluetooth transceiver 45 adapted to process Bluetooth signal from MU 11.

Referring to FIG. 4B, MU 11 includes a shield conductor 30 that is adapted to prevent any data leaks between the optical transceiver 26 held on MU 11 and the optical transceiver 23 held on SU 14. MU 11 includes a radio frequency (RF) leak detector 31 adapted to detect leaks in RF transmission and to detect RF attempts to hack device 10 while in use. Leak detector 31 may provide triggered data feedback to a signal processor 43 on MU 11. Signal processor 43 is capable of generating a phase shift in RF frequency to 180 degrees to cancel out the active RF signal rendering it undetectable to a device attempting to hi-jack or intercept data or from hacking into the device to extract proprietary information. An RF cancellation signal may be propagated from detector 31 to a receiving component 32.

MU 11 includes a data generation and or injection component for introducing false or misleading information in communications with an unauthorized device in the event of the device attempting to hack information. This function may be assigned to component 31 or component 32. Primarily the component may introduce misleading or false data in transmission to an unknown or unauthorized device that has hijacked an active connection and is attempting to intercept data from the device. Misleading data or "ghost data" may also be transmitted during normal back and forth transmission of data between MU 11 and SU 14. In one implementation, both components 31 and 32 may detect RF leak, RF interference, may trigger phase shift signals, and may inject misleading information into a transmission intercepted by the unknown device.

Referring to both FIGS. 4A and 4B, contact points 22, 24, 33, and 34 on SU 14 of FIG. 4A match up in alignment with contact points 25, 40, 39 and 36 on MU 11. An option may be to transmit data using two or more of the contacts in addition to the contacts being magnetic coupling points for the two device layers SU 14 and MU 11. In one implementation, a hybrid approach to sending and receiving data between SU 14 and MU 11 may be observed where optical data transmission is handled separately from textural data simultaneously for a message or command, wherein the received data is matched for parsing after receipt at two locations on the receiving layer.

Device 10 may operate like a typical communications device and may include many or any of the traditional smartphone applications for messaging, email, browsing, conferencing, maps, calendar, and so on. Referring to FIG. 4B, MU 11 includes a two-channel Bluetooth transceiver 27 that communicates with Bluetooth transceiver 45 held on SU 14. Bluetooth is supported and defined by an application resident on MU 11 the application also afforded to and resident on SU 14 rendering both layers Bluetooth capable devices functioning as nodes on a Bluetooth network.

In one implementation, Bluetooth signal strength may be used to determine how far away one layer of device 10 may be from the other layer of device 10. If too far one or both device layers may emit an audible alert, a vibratory alert, or may send an automated message via an alternative communications channel that a user may have lost or become separated from one layer of device 10 while the device was decoupled.

In one implementation, a phase detection antenna may be provided and supported on one or both layers of device 10. A phase detection antenna may determine the origin of an alert signal for use in detecting where the other layer is located. Using a dedicated signal generator and detector may be more economic than using Bluetooth signal, which may become weak at higher distance. In one embodiment, a Global Positioning Satellite (GPS) module may be added to SU 14 and to MU 11 to aid in device layer location and typically device location of device 10 when coupled.

Referring to FIG. 4B, Bluetooth transceiver 27 may include a dedicated channel or mode for listening to music or to audio of a telephone conversation through a Bluetooth headset. MU 11 includes a wireless fidelity (WiFi) module 28. WiFi module 28 enables device connection to and communication over the Internet using WiFi. MU 11 includes a long-term evolution (LTE) module 29 adapted to enable connection to an LTE network. In one embodiment communications preferences may be set relative to communications means like WiFi calling having priority over or otherwise used instead of LTE network calling, for example.

Referring to both FIG. 4A and FIG. 4B, layer SU 14 and layer MU 11 fit together, in one implementation using magnetized contact points 25, 40, 36, and 39 on MU 11 that align with and magnetically connect to the contact points 24, 22, 34, and 33 on SU 14. In one implementation, magnetic contact points may also serve as device layer charging pads for SU 14. In another implementation, the contact points may also be used as data channels for transferring data that may or may not be encrypted between layers of device 10.

Referring to FIG. 4B, MU 11 includes a camera 37 and a source of illumination like an LED light 38. Camera 37 may function as a camera for taking photos and videos and as an optical recognition device that can read cards, bar codes, and other symbol technologies. Light 38 may be used on demand to illuminate for camera 37 or simply to illuminate an area around the user.

Referring to FIGS. 4A and 4B, device 10 may include a triple axis (x,y,z) accelerometer distribute to both layers of device 10. An accelerometer may provide different purposes depending upon the application controlling the data produced by it. An accelerometer provides data for device orientation, device separation, acceleration forces on the device, angular direction of movement of the device, etc. In this implementation, a compass module 48 is provided on SU 14 and a corresponding compass module 49 is provided on MU 11. Either layer may determine NESW orientation or direction via the compass element. Device 10 may use one or the other compass element when the layers are coupled.

Referring to FIG. 4B, MU 11 includes an induction charging pad 44 supported by coil that may be used to charge SU 11 or NFC data transmission between layers of device 10. NFC may also be used to communicate as a layer, for example, MU 11 to another NFC capable device. In one embodiment, electronic strain gauges 41 and 42 are provided to MU 11 and arranged in a crisscross pattern. Gauges 41 and 42 are adapted to detect strain in the form of bend or other forced deviation from a straight x axis and y axis. This might be accomplished using a piezoelectric transducer technology wherein both gauges 41 and 42 are piezoelectric transducers.

In general, piezoelectric transducers work on the principle of piezoelectric effect When mechanical stress or forces are applied to some materials along certain planes, they produce an electric voltage. This electric voltage can be measured easily by voltage measuring instruments, which can be used to measure the stress or force that created the voltage.

In a variation to the above embodiment, gauges 41 and 42 may be piezoelectric quartz gauges that produce a voltage when stressed that may amplified on the MU device and may be used to charge the battery on SU 14. If the stress detection gauges 41 and 42 detect a predefined stress level at or above critical threshold value, for example a voltage might be generated to cause the gauges in the x or the y directions to firm up or piezoelectric flex opposite of the stress indication aiding in mitigating ongoing physical stress to device 10.

Figure 5:
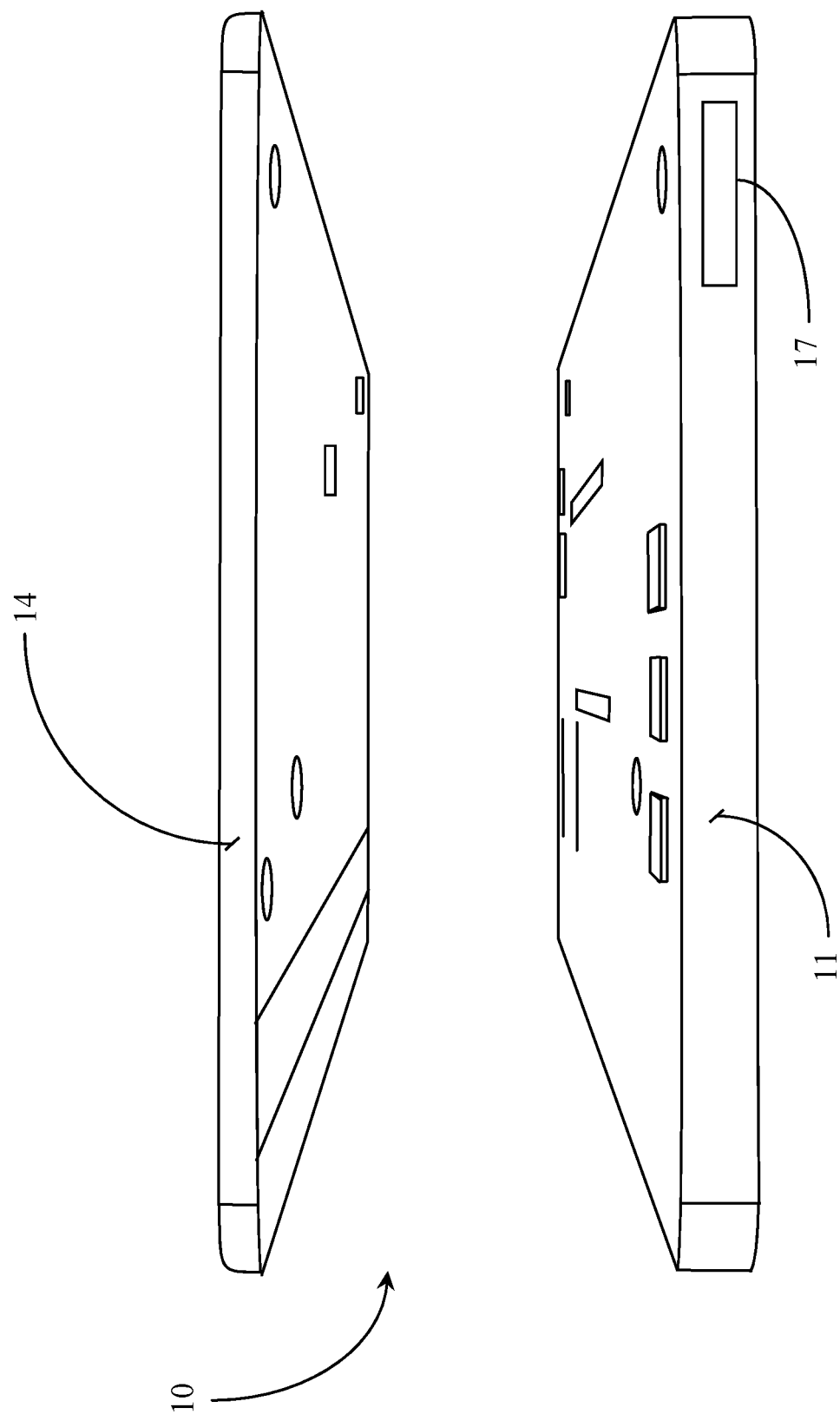
FIG. 5 is an exploded perspective view of the master unit and slave unit oriented for coupling.

FIG. 5 is an exploded perspective view of the master unit 11 and slave unit 12 of device 10 oriented for layer coupling to form device 10. In this view, SU 14 is the thin layer and MU 11 is the thicker layer of dual layer device 10. Speaker component 17 described further above is visible in this view on MU 11. Speaker component 17 may also be a vibrating element in one embodiment that may be used to alert the user of an incoming call or message or other form of alert or notification.

It will be apparent to the skilled person that the dual layer smart card/phone device 10 may be provided using some or all the described elements in support of the various embodiments described herein, each embodiment a potential implementation of the present invention. These exemplary descriptions do not preclude other implementations and use cases not described in detail. The present invention is not limited in scope to a single use case or embodiment. The present invention is limited only by the following claims.

What is claimed is:

1. A computer telephony integrated (CTI) mobile transactional and communications device comprising:
a first physical layer of electronic components adapted to fit in a first rectangular housing having a length, a width, and an internal volume defined by a uniform thickness, the components adapted in aggregate to function as a mobile CTI communications device capable of accessing a wireless mobile network;
a second physical layer of electronic components adapted to fit in a second rectangular housing having a same or similar length and width as the first rectangular housing, the second housing having less internal volume defined by a uniform thickness, the components adapted in aggregate to function as a mobile smart card capable of accessing a financial network to perform transactions and manage accounts, the first and second housings adapted to be coupled;
a plurality of contact pads distributed in like number and geometric pattern to interfacing sides of the first and second housings, the contact pads magnetized to attract opposing contact pads to couple the first and second housings together along the interfacing sides.

2. The device of claim 1, wherein the wireless network is one of a wireless fidelity network (WiFi) or a long term evolution (LTE) network.

3. The device of claim 1, wherein the first physical layer of electronic components define a master unit in computer hierarchy and wherein the second physical layer of electronic components define a slave unit depended to the master unit for power and programing.

4. The device of claim 3, wherein the master unit and slave unit may exchange data back and forth over a Bluetooth network connection and or a near field connection (NFC).

5. The device of claim 3 wherein the slave unit may be adapted to access and exchange or transact via magnetic stripe at point of sale terminals and through Euro pay, MasterCard, Visa, (EMV) terminals.

6. The device of claim 3, wherein the master unit charges the slave unit by induction coil through induction charging pads that make contact when the units are coupled.

7. The device of claim 1, wherein the length and width dimension for the first and second housings conforms to a credit card form factor.

8. The device of claim 7, wherein the thickness dimension of the second rectangular housing conforms to the thickness dimension of a standard credit card form factor.

9. The device of claim 1, wherein the first layer of electronic components include a battery, a controller, and computer memory hosting a platform software master program and wherein the second layer of electronic components include a battery, a controller, and a computer memory hosting a slave program to the master program.

10. The device of claim 1, wherein two or more of the plurality of contact pads may be adapted as data exchange points between the first and second layers of components.

11. The device of claim 1, wherein the first housing supports a first touch screen display device occupying most or all of the rectangular surface thereof and wherein the second housing supports a second screen display for providing visual data to a user when the second housing is decoupled from the first housing.

12. The device of claim 1, further including:
a first accelerometer among the electronic components of the first layer; and
a second accelerometer among the components of the second layer.

13. The device of claim 1, further including:
a signal processor among the electronic components of the first layer; and
at least one radio frequency leak detection circuit among the electronic components of the first layer;
wherein the at least one leak detection circuit is adapted to direct by electronic notification to the signal processor, an 180-degree phase shift in the active radio frequency.

14. The device of claim 13, further including at least one data injecting circuit among the electronic components in the first layer, the data injecting circuit capable of sending misinformation to a device attempting to access the device without authorization.

15. The device of claim 1, further including:
- a first strain gauge on the interfacing side of the first rectangular housing, the strain gauge adapted to detect a bend along the x axis on the surface of the first rectangular housing; and
- a second strain gauge on the interfacing side of the first rectangular housing, the second strain gauge adapted to detect a bend along the y axis on the surface of the first rectangular housing.

16. The device of claim 15, wherein the first and second strain gauges are piezoelectric crystals triggered by stress to produce an output voltage that may be amplified.

17. The device of claim 16, wherein the output voltage is used to charge a battery in the second rectangular housing.

18. The device of claim 17, wherein a voltage is applied to the strain gauges to mitigate stress to a critical level by causing the gauges to flex opposite of the indicated stress forces.

\* \* \* \* \*